Figure 1:
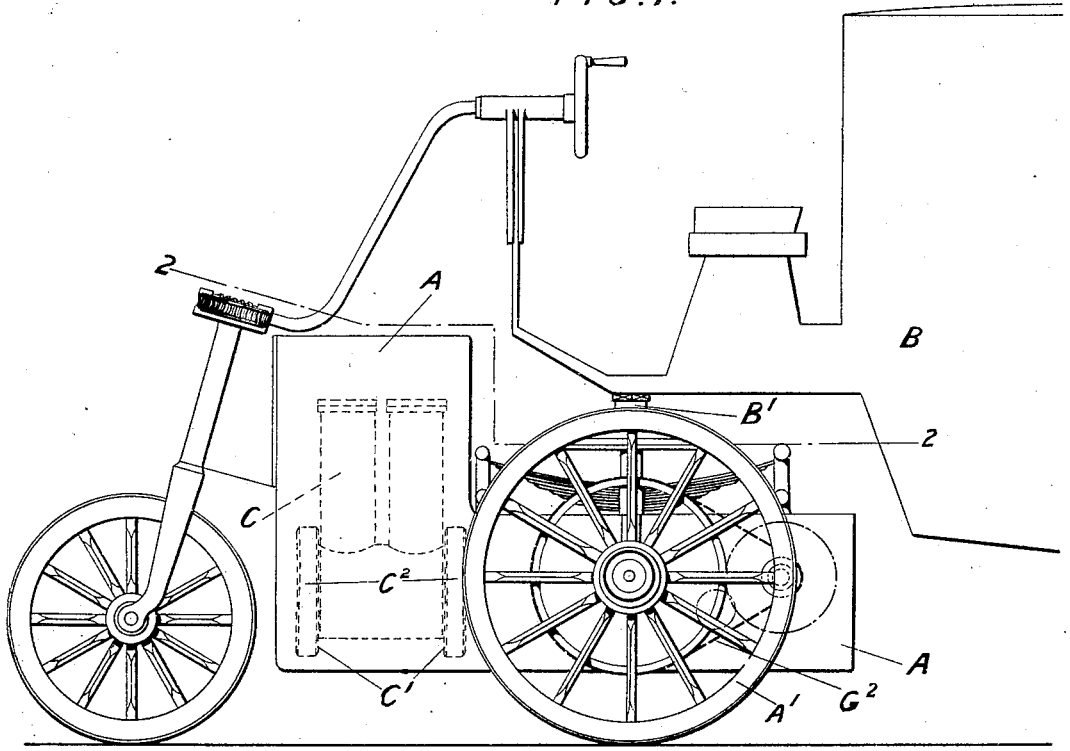

No. 644,671. Patented Mar. 6, 1900.
C. M. JOHNSON.
ELECTRIC MOTOR CAR.
(Application filed Aug. 8, 1898.)

(No Model.) 2 Sheets—Sheet 1.

No. 644,671. Patented Mar. 6, 1900.
C. M. JOHNSON.
ELECTRIC MOTOR CAR.
(Application filed Aug. 8, 1898.)
(No Model.) 2 Sheets—Sheet 2.
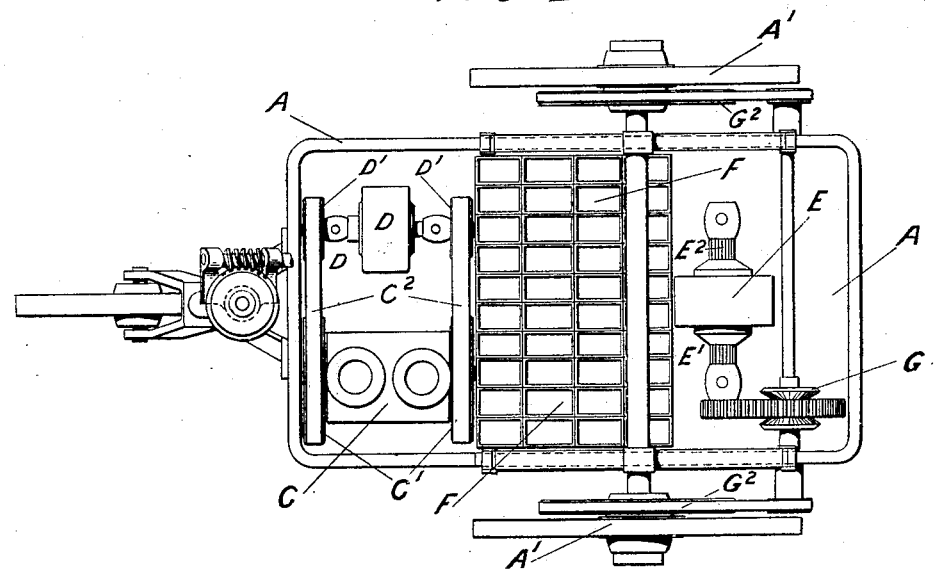
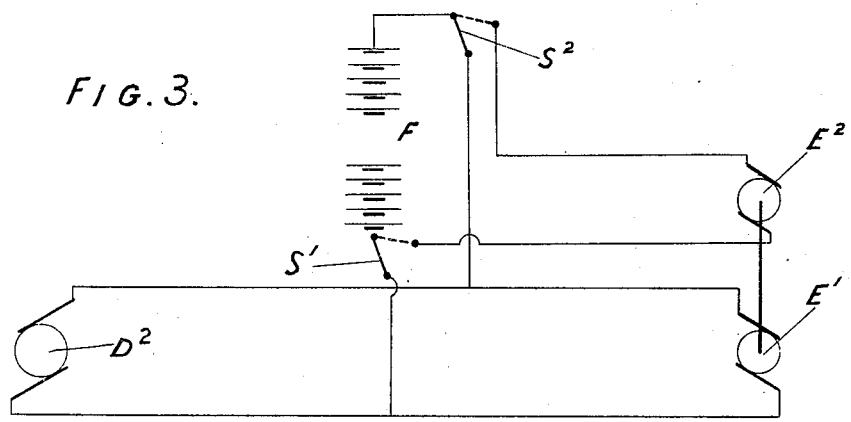
Witnesses:
A. L. Messer
V. M. MacLellan
Inventor.
Charles M. Johnson
By J S Lusk
Atty

UNITED STATES PATENT OFFICE.

CHARLES M. JOHNSON, OF NEW YORK, N. Y.

ELECTRIC-MOTOR CAR.

SPECIFICATION forming part of Letters Patent No. 644,671, dated March 6, 1900.

Application filed August 8, 1898. Serial No. 688,098. (No model.)

*To all whom it may concern:*

Be it known that I, CHARLES M. JOHNSON, a citizen of the United States of America, and a resident of New York, State of New York, temporarily residing at London, England, have invented certain new and useful Improvements in Motor-Cars, of which the following is a specification.

This invention relates to motor-cars, its object being to construct an apparatus which shall be capable of generating for at least a short time a high power, and which yet shall occupy a small space and be of light weight. According to this invention a prime motor—say, for instance, an oil-engine—is combined with an electrical generator, electric storage battery, and an electric motor in such a manner that when the generator is operating the motor under normal conditions or conditions of light load it is also storing power electrically, the stored power being available on emergency—say in mounting a hill—to assist in operating the motor. This may be effected by providing the motor-armature with two sets of windings and two commutators, the generator under normal conditions charging the battery and operating the motor through one commutator, the other commutator being, when additional power is desired, put in connection with the storage battery, which then assists to drive the motor by sending current through the second set of windings. By this arrangement I am enabled to employ a prime motor of small power—sufficient, that is, for driving a car along the level and up moderate inclines and for charging the storage battery at the same time—the battery being available when required to aid in propelling the car, say, up severe inclines, or when starting. This arrangement further allows the prime motor—say an oil-engine—to be worked at a steady or very nearly steady load, thus enabling a high efficiency and very perfect combustion of the explosive charge to be attained.

One arrangement according to this invention is set forth in the accompanying drawings, of which—

Figure 1 is a diagrammatic elevation of the working parts of a motor-car. Fig. 2 is a section on the line 2 2 of Fig. 1, and Fig. 3 is a diagram of the electrical connections.

As shown in Fig. 1, the motor-car is formed of two parts A and B, the portion A carrying the machinery which effects the propulsion of the car, the portion B being intended to carry, say, passengers. The two portions A and B are connected together pivotally at B', so as to allow for turning. The portion A carries an oil or other engine C, a dynamo D, a motor E, and a battery of accumulators F.

The engine C is preferably a twin engine and provided with two fly-wheels C', driving the dynamo D by means of belts $C^2$, running on pulleys D', one on each end of the dynamo-shaft. The engine and dynamo are conveniently situated, as shown, at the forward part of the car-body A, the motor E being situated at the rear of the said body and connected through an equational gear G, belt $G^2$, and intermediate pulleys to the driving-wheels A'. The motor is provided with two commutators $E'$ $E^2$, each of which communicates with a separate set of windings on the armature.

For the sake of clearness the brushes and brush-gear are omitted in the drawings both from the dynamo and from the motor, any well-known arrangement being adopted for this.

When the car is running under normal or light conditions of load, the dynamo will be operating, partly to charge the accumulator and partly to drive the motor E, through one of the commutators—say $E'$—and the engine may then be working at or nearly at its full power. When, however, a steep hill has to be surmounted or a higher power is for any reason desirable, the accumulators are disconnected from the dynamo and switched onto the other commutator $E^2$ of the motor, which, therefore, is supplied with approximately double the former power. The electrical connections by which this is effected are shown diagrammatically in Fig. 3, in which the dynamo-commutator is represented at $D^2$ and the two motor-commutators at $E'$ $E^2$, respectively, the accumulator being indicated at F. Two-way switches $S'$ $S^2$ are provided, which when in the position shown in the full lines put the accumulator in connection with the dynamo for the purpose of charging, the dynamo being in connection with the commutator $E'$ of the motor. When the switches are moved into the positions indicated in dotted lines, the accumulator will be disconnected from the dynamo and put in connection with the second commutator E² of the motor, which it will therefore supply with power.

Adjusting-resistances may be provided, as is usual, to regulate the dynamo and the motor, and, if desired, also to regulate the accumulator, or, if preferred, the latter may be regulated by a multiple-contact switch of the kind commonly employed for that purpose.

This invention is not limited to the precise arrangement hereinbefore described, and illustrated in the accompanying drawings; but the details of the said arrangement may obviously be considerably varied without departing from the spirit of this invention, which has clearly been set forth to be chiefly the provision for generating a high power on emergency with the employment of apparatus working normally at and designed for a lower power. For instance, if preferred, the motor may be of any well-known construction—that is, provided with only one armature-winding and one commutator instead of two, as hereinbefore described, and the accumulator and dynamo may be arranged in such a case to operate conjointly upon one and the same commutator and armature-winding of the motor.

I claim—

1. In a motor-car, an electric motor having a single field-winding and double armature-windings, the said armature-windings being independent of each other and mounted on a common core, a commutator for each of said armature-windings, a storage battery connected with one of said commutators, a generator of electricity connected with the other of said commutators, a circuit connecting the generator with said storage battery, and a switch controlling said circuit.

2. In a motor-car, a prime motor, a dynamo driven by said prime motor, a storage battery, a circuit connecting said storage battery with said dynamo, a switch controlling said circuit, an electric motor having a single field-winding and double armature-windings, the said armature-windings being independent of each other and mounted on a common core, a commutator for each of said armature-windings, a circuit connecting one of said commutators with said dynamo, a circuit connecting the other of said commutators with said storage battery, and a switch for controlling the last-mentioned circuit.

In testimony whereof I have hereto set my hand in the presence of the two subscribing witnesses.

CHARLES M. JOHNSON.

Witnesses:
ALFRED NUTTING,
FREDERICK G. LUNNON.